(12) United States Patent
Khan

(10) Patent No.: US 11,697,776 B1
(45) Date of Patent: Jul. 11, 2023

(54) TREATMENT OF HEAVY CRUDE OIL AND BITUMEN RECOVERY FROM SURFACE TAR SANDS WITH MAGNETIZED OXYGEN/AIR MICRO NANO BUBBLES WATER

(71) Applicant: Gulab Khan, Vibalia, CA (US)

(72) Inventor: Gulab Khan, Vibalia, CA (US)

(*) Notice: Subject to any disclaimer, the term of this patent is extended or adjusted under 35 U.S.C. 154(b) by 0 days.

(21) Appl. No.: 17/985,882

(22) Filed: Nov. 13, 2022

Related U.S. Application Data

(60) Provisional application No. 63/408,817, filed on Sep. 21, 2022.

(51) Int. Cl.
| | | |
|---|---|---|
| C10G 32/02 | (2006.01) | |
| B01D 21/26 | (2006.01) | |
| C10G 1/04 | (2006.01) | |

(52) U.S. Cl.
CPC ............ *C10G 32/02* (2013.01); *B01D 21/267* (2013.01); *C10G 1/045* (2013.01); *C10G 2300/1033* (2013.01)

(58) Field of Classification Search
CPC .............................. C10G 32/02; C10G 1/045; C10G 2300/1033; B01D 21/267
See application file for complete search history.

(56) References Cited

FOREIGN PATENT DOCUMENTS

WO    WO-2017201016 A1 * 11/2017 ......... B01D 17/0205

* cited by examiner

*Primary Examiner* — Randy Boyer
*Assistant Examiner* — Juan C Valencia
(74) *Attorney, Agent, or Firm* — Karin C. Khan

(57) ABSTRACT

A method for the treatment of heavy crude oil with magnetized oxygen/air micro nano bubble water, comprising the steps of generating micro nano bubbles water from treated water by a depressurization process; pumping heavy crude oil and oxygen with the micro nano bubbles water at an injection port; injecting via the injection port a mixture of heavy crude oil and oxygen micro nano bubbles water into a first magnetic unit; subjecting the mixture to a magnetic field under static mixing conditions in the first magnetic unit; injecting the mixture into an interim tank; pressurizing the heavy crude oil and water exiting the interim tank via a slurry pump; pumping the heavy crude oil and water through a second magnetic unit before routing to a first hydrocyclone unit; and routing an overflow of the heavy crude oil for refinery purposes.

19 Claims, 3 Drawing Sheets

TREATMENT OF HEAVY CRUDE OIL AND BITUMEN RECOVERY FROM SURFACE TAR SANDS WITH MAGNETIZED OXYGEN/AIR MICRO NANO BUBBLES WATER

PRIORITY CLAM

This application claims the priority date of provisional application No. 63/408,817 filed on Sep. 21, 2022, which is herein incorporated by reference in its entirety.

BACKGROUND OF THE INVENTION

The properties of the heavy crude oil ("HCO") depends upon the reservoir formation, the processes associated with drilling and fracking techniques, secondary oil recovery and/or enhanced oil recovery ("EOR") techniques. The HCO is a stable mixture of colloids of clays, salts and fine particles, water/oil emulsion, aggregates of asphaltenes/resins and suspended solids exhibiting high viscosity, surface tension, and interfacial tension and having a negative zeta potential. Asphaltenes/resins are the major contributor to the above properties of HCO. Asphaltenes have the highest concentration of heteroatoms (N, O, S) and heavy metals (Fe, V, NI) bonded compounds compared to the resins. Aggregation and film formation of asphaltenes/resins is driven by the heteroatoms interaction; such as H-bonding Van Der Waals ("VDW") forces allow asphaltenes along with resins to adsorb, consolidate, and form cohesive film on the water/oil interface resulting in stable emulsion. Because of the high viscosity and surface tension and charges carrying properties of asphaltenes/resins a cohesive film exists on the water/oil and solids/oil interfaces. The aggregation of asphaltenes exists on nano scale as well as nano clusters form. The polarizability of asphaltenes/resins is due to the presence of (N, O, S) groups as naphthenic acids, amides, phenolic and sulfides groups attached to the asphaltenes/resins molecules.

In the existing art of technology heat and surfactants are used to lower viscosity, surface tension, and break up water/oil emulsion in order to transport to the refinery. The application of the existing art of technology does not completely change the physical properties of the HCO. The chemical composition of asphaltenes, resins and maltenes remains the same. In the refining process most asphaltenes, resins and maltenes and heavy metals end up as thick fluid called asphalt.

There is a need to change the physicochemical properties of HCO completely to achieve the higher recovery rate. The present invention of treating HCO with magnetized air/oxygen micro nano bubbles (MNB) water will, not only, change the physicochemical properties, but also break down chemical structure of asphaltenes/resins/maltenes into lower molecular weight soluble compounds resulting in higher recovery and valuable product.

The tar sands exist at surface (20 meters deep) as well as subsurface (200+meters) deposits. The present invention is only concerned with extraction of crude oil (bitumen) from surface tar sands with typical Canadian composition of:
  Bitumen 10%
  Water 5%
  Solids 85% (sand, clays, and/or salts)
The composition of bitumen is:
  Saturates 17%
  Aromatics 40%; polynuclear aromatic tar
  Resins 26%
  Asphaltenes 17%

The bitumen in tar sands is in amorphous form exhibiting very high viscosity and surface tension as compared to the HCO. The asphaltenes/resins exhibit same characteristics of aggregation and film forming, as in HCO, due the presence of heteroatom (N, O, S) groups containing naphthenic acid, amides, phenolics and sulfides. The water in bitumen is in H-bonded form with asphaltenes/resins covering the surface of sand particles. A highly cohesive film of asphaltenes/resins, due to the NOS groups, H-bonding, VDW and electrostatic forces, exist on the surface of solids.

In the existing art of technology the tar sands slurry is heated to 65-85 degrees C. for a specific time to loosen bitumen. The extracted bitumen along with water is subjected to dispersed and/or dissolved air floatation to skim off crude bitumen for further treatment with hydrocarbons for transport to refinery. The overall recovery is 75%. The recovered water is recycled and solids containing 25% of unrecovered bitumen are disposed off as reclamation step; a major environmental impact.

The asphaltenes and its aggregates are insoluble in softened mixture, Even at the existing softening temperature they still exhibit cohesive film formation with heteroatom and H-bonding with water with relatively high viscosity, surface tension and interfacial tension.

There is a need for an alternative to recover 25% leftover bitumen. The present invention of treating tar sands slurry at 50-55 degree Celsius with magnetized oxygen MNB water at alkaline conditions will not only remove bitumen completely, but also, break/eliminate cohesive film of asphaltenes/resins. Under alkaline conditions it will oxidize/break asphaltenes into resins, The increased concentration of resin in mixture will dissolve asphaltenes. The asphaltenes are soluble in resins at approximate ratio of resin/asphaltenes at 2:1. A 99+% recovery of bitumen, as an organic phase with low viscosity/surface tension and processable characteristics can be achieved by treating with magnetized oxygen MNB water.

BRIEF SUMMARY OF THE INVENTION

The present invention is treating surface tar sands for recovery of bitumen and heavy crude oil with magnetized air/oxygen MNB water to enhance the physicochemical properties; resulting in processable product with high recovery. It is essential to produce MNB. The MNB production via depressurization or other commercially available devices, is mixed with heavy crude oil and tar sands slurry followed by magnetization. Either magnetized air or oxygen MNB produce or recycle water could be used. The use of oxygen MNB is preferred for tar sands treatment. The air MNB to treat HCO is acceptable. The established optimum amount of oxygen MNB will be consumed where as use of air MNB will result into coalescing nitrogen MNB into larger disruptive bubbles effecting the efficiency.

In the present art of technology, the extraction of bitumen is carried out by the softening process of the slurried tar sands at 65 to 85° C.; followed by dissolved or dispersed air floatation. to skim off crude bitumen. The heavy crude oil is treated with heat and surfactants to breakdown emulsions of asphaltenes/resins, water/oil emulsion and colloids of fine particles to separate oil, water and solids. The treatment routes for the heavy crude oil and bitumen partially changes the physical properties only. The chemical composition remains the same. The product still exhibit relatively high viscosity, surface tension, interfacial tension and polar characteristics; hence requiring further treatment before the refining process.

The physicochemical characteristics of the treated bitumen and heavy crude oil by the magnetized oxygen/air MNB water are markedly different from the existing art of technologies. The properties of the magnetized air/oxygen MNB are high reactivity by MNB, reactive oxygen species ("ROS"), free radicals ("FR"), longer MNB stability with better dissolution of oxygen, high mobility and enhanced physical properties compared to MNB water alone and other technologies. The present invention entails concurrent physical and chemical reactions by MNB, ROS and FR under the effect of magnetic field. It depolarizes the charges on asphaltenes/resins and water/oil emulsions and colloidal particles; rendering them into a neutral state resulting in high mobility organics, salts and water phases. The components of the organic phase further react with MNB, ROS and FR. The oxidized salts will settle. The order of reaction by ROS, FR and MNB under the magnetic field the formation of degradation/reaction products has not been established. No information is available on the mechanism of reactions by MNB, ROS, and FR.

The magnetized oxygen/air water weakens the H-bonds and eliminates Van Der Waals ("VDW") forces between molecules; especially asphaltenes and resins bondings with N, O, S groups. The core molecules of asphaltenes/resins are bound with ester, ether and sulfur bonds. The magnetized oxygen MNB facilitate the cleavage of these bonds resulting in mobile asphaltenes, resins and organics with low molecular weight molecules.

The present invention breaks electrostatic bonds between heavy metals (Fe, V, Ni) and asphaltenes/resins. The asphaltenes/resins molecules exhibit neutral state and high mobility. The heavy metals are oxidized into settling salts. High mobile asphaltenes/resins molecules further react with MNB, ROS and FR. Generally broken asphaltenes result in resins.

The magnetized MNB form greater contact angle at the gas/solid and gas/liquid phases. High dissolution of oxygen MNB results in higher recovery and improved physicochemical properties of the organic phase.

Higher concentration of clays in tar sands facilitate catalytic oxidation, at the nano scale, of asphaltenes/resins, maltenes and saturates at the liquid/solid interface resulting in higher recovery.

The final product will have an organic phase with asphaltenes in solution, practically free of salts, lower molecular weight organics, lower viscosity, surface tension, and interfacial tension, requiring no further treatment for the refining process. The recovered solids from bitumen extraction with practically little bitumen will not only contribute to minimum environmental impact, but also the enhancement of the landscape ecosystem.

DETAILED DESCRIPTION OF THE PRESENT INVENTION

Figure 1:
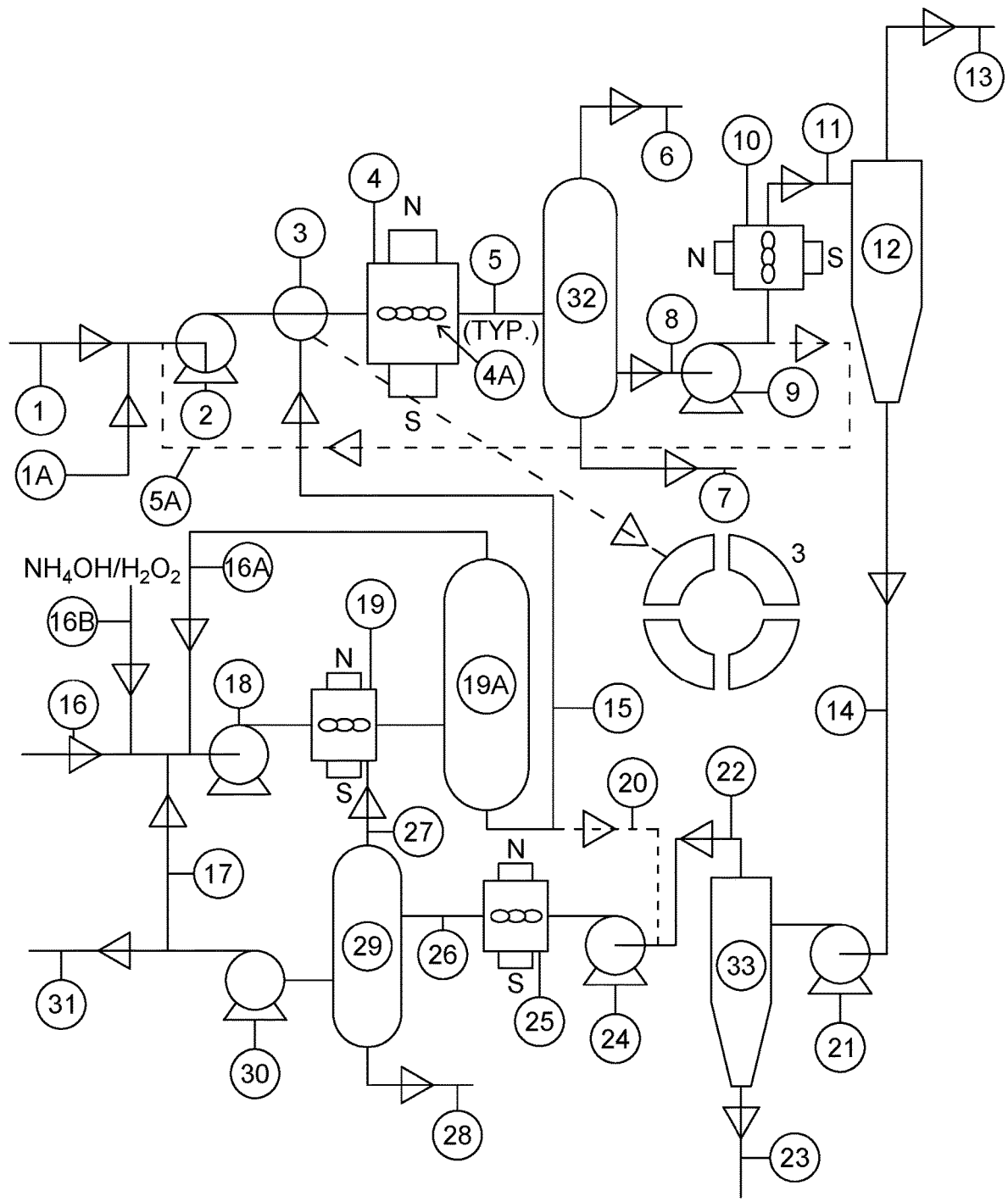
FIG. 1 illustrates the process flow for the treatment of heavy crude oil with magnetized oxygen/air MNB water.

The present invention is directed to a process for the treatment of surface tar ands and heavy crude oil with magnetized air/oxygen MNB water under alkaline conditions in ammonium hydroxide and hydrogen peroxide solutions, FIG. 1 depicts the process flow for the treatment of HCO with magnetized oxygen/air MNB water. The HCO typical components are saturates, polycyclic aromatics, resins, asphaltenes, water, colloids, and suspended solids. This composition varies with reservoir formation, processes associated with drilling and fracking techniques, secondary oil recovery, and EOR techniques. HCO exhibits high viscosity, surface tension, interfacial tension, oil/water emulsion, and asphaltenes/resins aggregates. The treatment of HCO by magnetized air/oxygen MNB water under alkaline conditions changes its physicochemical properties into a processable products with high recovery. The present invention includes the following treatment processes, namely, generation of MNB via depressurization (pumping mixture of oxygen/air and HCO without solids); magnetization of oil/MNB water with transverse magnetization of 500+mT magnetic field; and steps to separate water, oil and solids by using existing art of technology.

MNB PRODUCTION VIA DEPRESSURIZATION: A slip stream (17) from treated produce water (31) is mixed with controlled air/oxygen (16) and $NH_4OH/H_2O_2$ solutions (16B) and pumped (18) to 80-120 PSIG pressure by regenerative turbine pump (RGT) (18) or an equivalent to increase the solubility of oxygen. The pump breaks down gases into smaller sized bubbles. This facilitate higher gas solubility. The mixture is further subjected to magnetic field of 40-50 mT in the magnetic unit (19) to increase the solubility of oxygen under static mixing (4A) conditions, and it is depressurized via injection port (3) to a lower pressure to facilitate MNB formation.

The HCO (1) and oxygen (1A) mixture from the pump (2) has smaller oxygen bubbles as it mixes with the injected MNB water at the injection port (3) before entry to the magnetic unit (4) operating at 0 to 5 PSIG. The injection velocity should be three (3) times that of the fluid velocity of the mixture of HCO and oxygen. The nucleation of MNB occurs before entry to the magnetic unit (4). The mixture of water/oil/MNB water is immediately subjected to magnetic field of 4500+mT in magnetic unit (4) under static mixing (4A) conditions. For the effective magnetization in magnetic unit (4), the fluid velocity should be 5-6 ft/sec. The excess oxygen/air from the equilibrium tank (19A) is recycled (16A) to the suction of pump (2).

MAIN MAGNETIC UNIT (4). The magnetic flux requirements are 500+ mT which may be achieved by arrangement of rare earth magnets with associated ring/arc fixtures and carbon steel reflux plates/arcs. The magnetization could be axial, diametrical, circumferential, or of width to achieve the desired magnetic flux. The magnetic unit (4) has static mixing elements (4A) to facilitate good mixing as well as break down bubbles by shear forces to increase the surface area. The selection of magnets will depend upon the magnetic flux requirement established during the testing stage. For optimum treatment a slip stream (5A) from the discharge of pump (9) can be recirculated via pump (2) to the inlet of magnetic unit (4) for remagnetization. Approximately 15% of an exit stream (8) (of HCO and MNB water) from the interim tank (32) is recommended for recirculation.

PHASE SEPARATION. The magnetized mixture (5) enters the interim tank (32) operating at 0-5 PSIG. In case of air, excess nitrogen is vented (6). In case of oxygen, the unused oxygen is recycled to the suction of pump (2). The mixture enters interim tank (32) tangentially to produce a swilling effect. The tank (32) should be sized for 3-5 minutes retention time to separate wetted solids/sludge at the bottom of the tank (32). The exit stream (8) leaving the interim tank (32) is pressurized by a slurry pump (9) to a designed operating pressure of hydrocyclone (12). It is magnetized in magnetic unit (10) with a magnetic field of at least 100 mT before entering (11) the hydrocyclone (12). The crude oil overflow (13) is transported to the refinery. The underflow (14) solids/water is pumped (21) to the inlet of secondary hydrocyclone (33) to separate water and solids (as an alternative a phase separation tank could be used to separate crude oil/water/solids layers) The overflow water (22) from the secondary hydrocyclone (33) after mixing with MNB stream (20) is pressurized by pump (24) before magnetization in magnetic unit (25). The magnetized water (26) enters the separation tank (29) to vent off gases (27). The treated water is a produce water (31) for re-injection via pump (30) for secondary oil recovery. The treatment of produce water (31) is a polishing step. The requirements for the MNB treatment will be minimum or only require magnetization. The solid waste streams from hydrocyclone (33), underflow stream (23), interim tank (32), bottom stream (7), tank (29), and bottom stream (28) are disposed off.

Figure 2A:
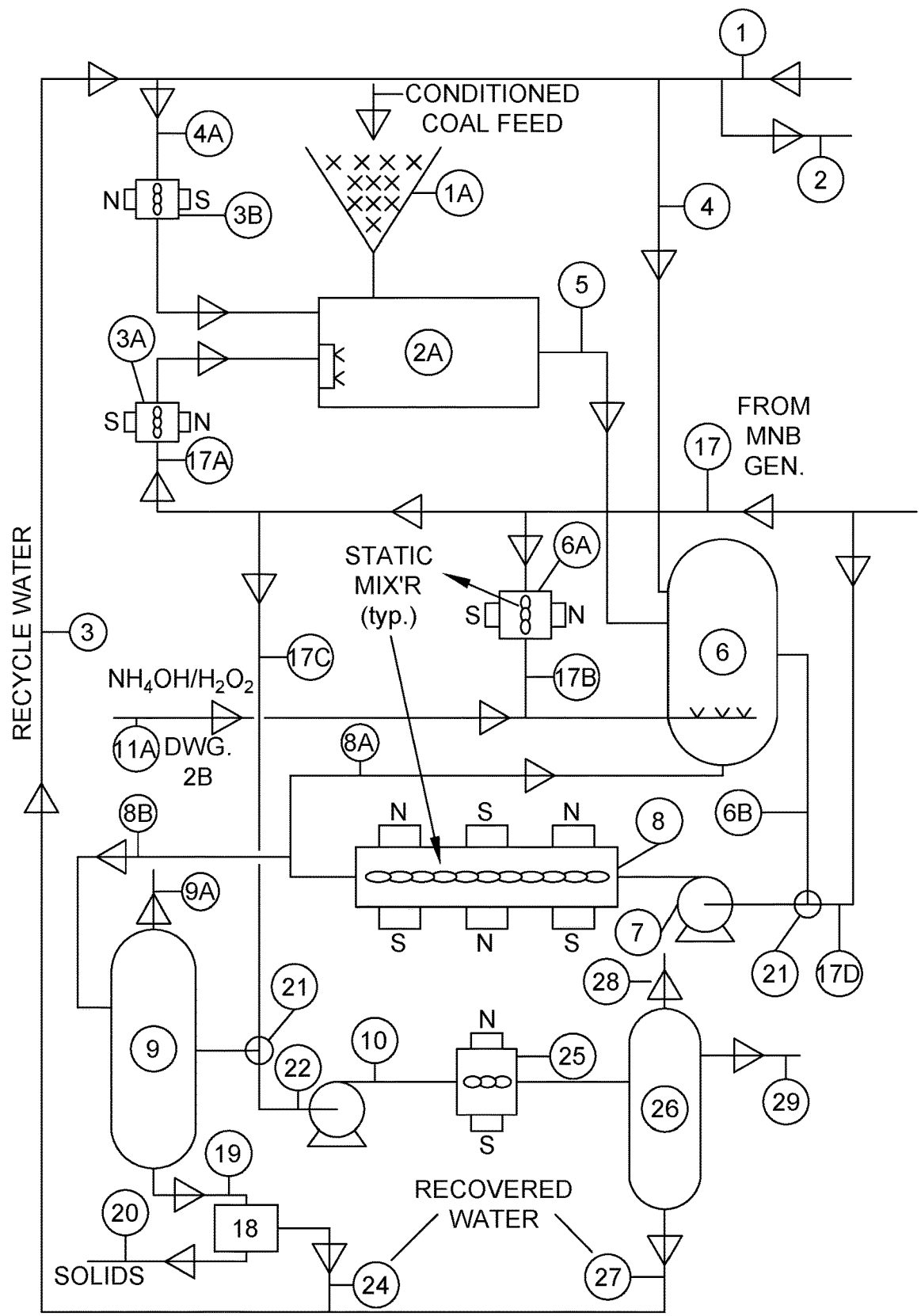
FIGS. 2(A) and 2(B) illustrate the process flows for the treatment of surface tar sands with magnetized oxygen/air MNB water.

FIGS. 2(A) and (B) depicts the process for the treatment of surface tar sands. In the existing art of technology, tar sands are slurried with hot water at 65° to 855° C. for predetermined time to soften and separate bitumen from the solids surface. The recovered solids are shipped for reclamation. The mixture of water and crude bitumen is subjected to dispersed or dissolved air floatation. The crude bitumen is skimmed off and after further treatment with hydrocarbons is transported to the refinery. The water is recycled. The overall recovery of bitumen is approximately 75%.

Due to the polar properties (susceptible to magnetic field), of asphaltenes and resins, a cohesive bitumen film exists on the solids surface. This film cannot be removed completely by hot water softening process. The bitumen at the hot water temperature still exhibit relatively high viscosity, surface tension, and polar characteristics resulting in incomplete removal of the asphaltenes/resins and heavy hydrocarbons layer. An alternative is essential to achieve higher recovery of 99+%. This Objective can be achieved by the present invention as described below.

EXTRACTION OF TAR SANDS, The following processes are necessary for the effective recovery of bitumen.

GRINDING TREATMENT (See FIGS. 2(A) & (B)). The grinding step is to increase the surface area of tar sands in the presence of oxygen MNB water under alkaline conditions at 40 degree C. temperature. At a pH of 9-12, the bitumen mechanical strength weakens as well as its structure partially broken/fragmented. The ROS and FR react with bitumen components resulting into low molecular weight compounds. The grinding stress forces can further break up MNB into nano bubbles contributing to the increased process efficiency. Adsorbed oxygen (ROS and FR) at surface of heavy organics reacts with side chain aliphatic groups on polycyclic aromatics resulting into lower molecular weight compounds. The electrostatic and VDW forces between asphaltenes/resins and heavy metals (V, Ni, Fe and other porphyrins) are broken and metals are oxidized into settling salts. The H-bond between polyaromatics, asphaltenes, resins, and heteroatom N, O, S is broken. They react with adsorbed oxygen and oxidized into lower molecular weight compounds. With the removal of organic layer from salts, the inorganic salts are hydrated/oxidized into settling salts.

GRINDING PROCESS (See FIGS. 2(A) &. (B)). The tar sands from a feed hopper (1A) is mixed with alkaline magnetized (3A) MNB water stream (17A) in grinding mill (2A) to achieve 1 mm size particles. The magnetized (magnetic unit 3B) make-up water makeup (4A) is added as necessary. During the grinding process the physicochemical characteristics changes take place in tar sands as mentioned above. The partially treated slurry from the grinding process is fed to the slurry tank (6) for total extraction of bitumen.

TAR SANDS SLURRY TANK (6) (See FIGS, 2(A) & (B)). The partially treated slurry from the grinding step is further treated in slurry tank (6) at 40 degrees C. and pH of 9-12 under fluidized conditions. High concentration of oxygen MNB is maintained by injecting MNB water stream (17:13). The water contents in the slurry tank (6) are maintained at 15% or less. The higher water contents slows the oxygen adsorption on the surface of organics resulting in lower oxidation rate.

To maintain the fluidized conditions for effective extraction of bitumen, partial recirculation of effluent stream (6B) from the slurry tank is necessary. The stream (6B) from the slurry tank (6) is mixed with MNB stream (17D) at injection port (21) and pressurized by pump (7) to 50 followed by magnetization (500+mT) in the main magnetic unit (8). The magnetized exit stream (which becomes 8A and 8B as hereinafter referenced) is split into 75/25 flow ratio. 75% of exit stream as exit stream flow (8A) is recirculated to the slurry tank (6) to maintain the fluidized conditions and 25% of exit stream as exit stream flow (8B) enters the primary phase separation tank (9).

In tar sands, the ratio of bitumen to water plus inorganic salts is 1:9. Due to this low ratio, it is essential to increase the probability of collision between oxygen MNB and bitumen. For effective extraction fluidized conditions, high concentration of MNB, optimum water contents and longer retention time are necessary. The physicochemical reactions in the slurry tank (6) are similar as explained in the grinding process above. Additional details regarding the physicochemical characteristics are further explained below in section "Physicochemical characteristics with magnetized oxygen MNB."

PRIMARY PHASES SEPARATION TANK (9). The exit stream flow (8B) 25% split from the slurry tank (6) enters the primary phase separation tank (9) to separate crude bitumen (liquid or semi-liquid state), water, and solids layers. The solids and most of the water layer is withdrawn from the bottom of the primary tank (9) as stream (19) to separate water and solids in unit (18). The recovered solids (20) is for reclamation and recovered water (24) is recycled. The vent gases (9A) from the primary tank can have high oxygen concentration and should be recycled to the suction of pump (7).

TREATMENT OF WATER AND CRUDE BITUMEN (liquid). The water/crude bitumen liquid from the primary tank (9) is mixed via injection port (21) with oxygen MNB water stream (17C) and the mixture, as stream (22), is pressurized to 50 PSIG by pump (10) followed by magnetization in magnetic unit (25) before entering the secondary interim tank (26) to separate water and crude bitumen (liquid) layers. The top crude bitumen layer (29) is shipped to refinery and bottom water layer is recycled.

Figure 2B:
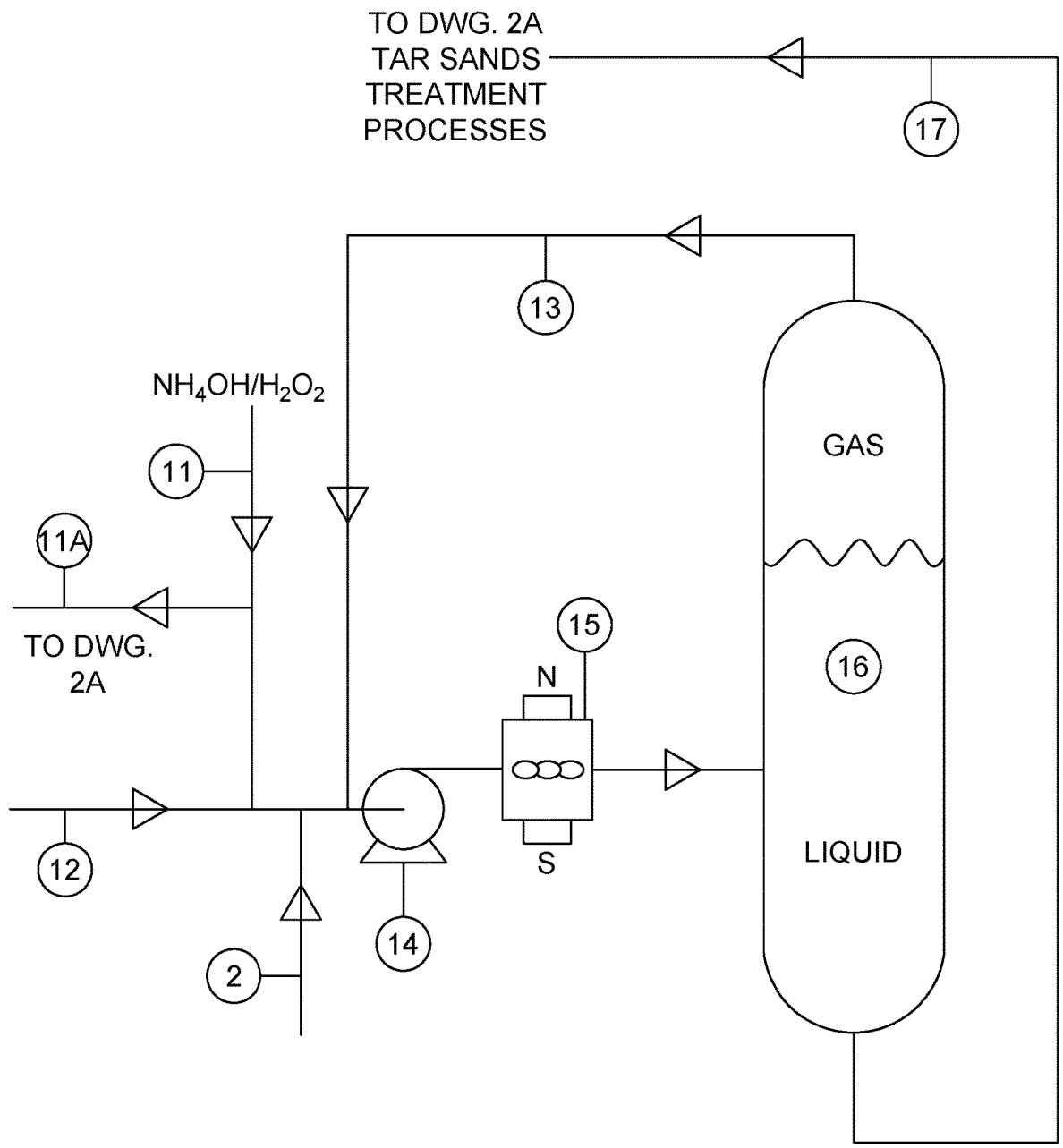

MNB GENERATOR PROCESS (See FIG. 2(B)). The depressurization route to produce MNB has been selected. A commercial nano bubbles generator with 70%+concentration of 150-170 nano bubbles should be evaluated for selection. A slip stream (2) from the makeup water (1) is mixed with controlled oxygen (12), $NH_4OH/H_2O_2$ solution (11) and the mixture is pressurized to 80-120 PSIG by RGT pump (14). The pump (14) breaks down oxygen bubbles as well as increase the solubility of oxygen. The mixture is further subjected to magnetic field by the magnetic unit (15) at a lower magnetic field (40 MT) to facilitate higher solubility of oxygen under static mixing conditions. The mixture enters the equilibrium tank (16), The undissolved oxygen is recycled (13) to the suction of pump (14). The oxygen supper saturated water (17) supplies oxygen MNB water at four ports for the following processes.

GRINDING PROCESS (See FIG. 2(A)). Stream (17A) after magnetization in magnetic unit (3A) is injected via spray nozzles in the grinding vessel (2A) to maintain high concentration oxygen MNB.

SLURRY TANK (6). The MNB stream (17B) after magnetizing in magnetic unit (6A) is injected via spray nozzles in the slurry tank (6) to maintain high concentration of oxygen MNB for effective extraction of bitumen.

SLURRY TANK RECIRCULATION. The effluent (6B) from the slurry tank (6) is mixed with MNB water stream (17D) via injection port (21) and the mixture is pressurized by pump (7) followed by magnetization in magnetic unit (8). After magnetization, the exit stream is split into 75/25 flow ratio (as also referenced above). The 75% split flow (exit stream flow (8A)) is recirculated to the slurry tank (6) to maintain fluidized conditions and 25% split flow (exit stream flow (&B)) enters the primary interim tank (9) for separation of water/crude bitumen/water/solids phases in the primary tank (9).

CRUDE BITUMEN/WATER/SOLIDS SEPARATION; PRIMARY TANK (9). Bottom layer (water/solids) as stream (19) enters the water/solids separation unit (18) to separate water as stream (24) and solids stream (20) as reclamation. Vent (9A) containing high concentration of oxygen is recycled to the suction of pump (7). The crude bitumen (liquid) layer from the tank (9) affect treatment enters the secondary tank (26).

TREATMENT OF CRUDE BITUMEN (LIQUID) AND WATER MIXTURE. The water/bitumen mixture from the primary tank (9) is mixed with MNB water stream (17C) at injection port (21) and pressurized as stream (22) by pump (10) and after magnetization in magnetic unit (25) enters the secondary interim tank (26) for liquid bitumen and water layers separation, The liquid bitumen upper layer as stream (29) is shipped to the refinery. The bottom layer of water as stream (27) is recycled. Any gases are vented as stream (28).

PHYSICOCHEMICAL CHARACTERISTICS WITH MAGNETIZED AIR/OXYGEN MNB WATER TREATMENT. The basic information is to understand the effect on the physicochemical properties of HCO and bitumen extraction from tar sands, after subjecting the mixture of oxygen MNB water, HCO and tar sands slurry to a strong magnetic field. The magnetized MNB water has unique, enhanced reactive properties as compared to existing art of technologies.

Treatment of HCO and extraction of bitumen from tar sands with magnetized air/oxygen MNB has an effect on the physicochemical properties as both magnetic field and MNB decrease the viscosity, surface tension and interfacial tension of HCO and extracted crude bitumen. Smaller MNB and magnetic field weaken/break the H-bond and eliminate VDW and electrostatic forces between the molecules resulting in an overall increase in mobility of the organic phase. The magnetized MNB treated oil phase exhibit minimum formation of clusters and aggregation of asphaltenes and resins molecules. The ROS at the MNB/oil, MNB/water and MNB/solids interfaces react with the oil components and change their physicochemical properties as well as chemical structure, The treatment of bitumen with magnetized oxygen MNB water is more effective than softening followed by dispersed or dissolved air floatation. A 99+% removal of bitumen can be achieved by treating with magnetized oxygen MNB water. Smaller bubble size with large surface area results in higher concentration of MNB and ROS and FR impacting the properties as well as process-ability of the HCO and bitumen. Anionic surfactant, magnetic field and alkaline conditions (pH 8.5 to 9.5) produce smaller bubbles with longer stability and reactive oxygen MNB. This improves oxygen consumption resulting in an efficient process. The use of ethanol as surfactant can also facilitate smaller and stable bubbles. The magnetic field contribute to smaller, stable and highly mobile oxygen MNB with better dissolution of oxygen and high MNB concentration resulting in a more effective treatment. The magnetized MNB affects the physical properties of the bulk liquid by increasing the mobility of water/oil components and increased ionization of salts.

Asphaltenes are mainly composed of polycondensed aromatic benzene, and organic groups with heteroatom (N, O, S) in the form of amide, phenolic, sulfide, carbonyl and naphthenic acids. These groups are charge carriers and contribute to the asphaltenes molecules association and aggregation by charge transfer in the H-bonding and VDW forces. The resins as a surfactant form nano aggregates with asphaltenes as nano particles emulsion/colloid in crude oil. The treatment with magnetized oxygen MNB water will eliminate VDW forces, break/weaken H-bonding and eliminate electrostatic bonding of resins with asphaltenes molecules rendering them into an inert state. Highly mobile molecules react with MNB, ROS and FR resulting in higher recovery and low molecular weight compounds.

The ROS at gas/liquid and gas/solids interfaces will react with organic components. The magnetic field and MNB affect the dissociation of charges carrier NH, S, OH, CO, COOH ions and increases their mobility. The negative ions accumulate at gas/liquid interface resulting in high concentration gradient. This leads to bubble collapse with formation of FR and smaller MNB which further react with asphaltenes and resins resulting in lower molecular weight organics with different properties. The oxidation of asphaltenes generally produce resins. The collapsing MNB produce FR (OH*) which is highly reactive in alkaline aquas media. The FR action on the organics could be H-abstraction, addition to double bond or an electron transfer. The resulting bi-radicals easily combine with mobile oxygen MNB peroxide radicals. The product OH* radicals and their reaction with organics to produce bi-radical and end products is a complex process and has not been established.

The breakdown of asphaltenes into resins increase resins/asphaltenes ratio in the crude oil. At higher concentration of resins, asphaltenes become soluble in crude oil. Typically the ratio is 2:1 resin/asphaltenes. The asphaltenes and resins also contain heavy metal salts Fe, V, Ni in colloidal state and/or electrostatic bonded form. The treatment with magnetized oxygen MNB water will neutralize electrostatic bond as well as oxidize them into stable salts; hence freeing the asphaltenes and resins molecules which will be further effected by ROS, FR, and MNB.

The magnetized oxygen MNB water will reduce the zeta potential of clays, silica and fine particles colloids into a neutral state. The inert particles, having increased wettability will settle. Because of the polar properties, the asphaltenes/resins form a cohesive film on the solids surface. At hot water temperature (65 to 85° C.) bitumen still exhibit high viscosity and surface tension; hence incomplete removal of the bitumen film resulting in poor recovery. The treatment with magnetized oxygen MNB may remove asphaltenes/resins 99+% even at lower temperatures of 50 to 55° C. The depolarized bitumen will not exhibit aggregation, colloidal, and/or emulsion characteristics.

The efficiency of extraction of bitumen may depend on factors such as: (a) initial treatment with MNB during the grinding stage; (b) particles size in the slurry less than 1 mm; (c) the oxygen bubble size, concentration and stability; (d) optimum retention time in the slurry tank; (e) optimum water volume for sustainable slurry; (f) optimum volume of $NH_4OH/H_2O_2$ solution to maintain a pH of 9-12 and magnetic flux; (g) addition of $NH_4OH/H_2O_2$ solution can facilitate smaller and stable oxygen bubbles; and (h) a fluidized slurry bed can facilitate an efficient process with comparatively less retention time.

The bench scale testing is necessary to establish the design parameters; specially optimum oxygen which will be used in the treatment process. The optimum oxygen requirements depends upon the type of tar sands and HCO. The higher contact angle at the gas/solids and gas/liquid interfaces will give enhanced dissolution of oxygen resulting in efficient removal of bitumen as well as enhanced reaction of MNB, FR, and ROS with the components of bitumen as well as FICO.

After the solids separation the liquid phase containing water/modified bitumen and residual MNB can be further treated with air or nitrogen MNB as a refining step; if necessary. The treated liquid has lower viscosity, surface and interfacial tensions with modified chemical structure. The water/oil can be separated in a settling tank or by hydrocyclone. Further treatment for transportation to the refinery is not necessary.

The magnetized oxygen MNB water has two effects on particles colloids/suspension. First, it alters the chemical equilibria of the dissolved species and second, it changes them into a neutral state directly impacting the stability and process-ability. The bubble size, ROS, and FR impacts the oxidation reaction with organic compounds. The surface area is generally very important concept. The smaller oxygen bubbles and liquid drops with large contact surface area facilitate enhanced MNB consumption. The oxygen MNB shrinkage rate is higher resulting in nano bubbles, affecting the overall properties of the fluid.

Substantial increase in MNB/water, MNB/oil and MNB/solids interfaces forming larger contact angle which facilitates effective oxidation of oil components by MNB, ROS, and FR. The increase of ions density at bubble/liquid interface results in bubble rupture with the formation of FR which will oxidize inorganic and breakdown organic compounds. The FR formation depend upon size and concentration of MNB and ions concentration. The optimum bubble size, concentration and magnetic flux, under controlled conditions can control the formation of FR and reaction with organic compounds to the desired level. This is also true for the ROS reaction control at gas/liquid interface.

The optimum size and concentration of oxygen MNB and magnetic flux to control the oxidation process bench scale testing is essential to establish the operating parameters. High concentration of MNB, magnetic flux and ROS/FR could result in unwanted oxidation products. With high concentration of MNB and ions, the concentration gradient at the gas/liquid interface may not be enough to cause a bubble rupture; hence lack of FR formation. Most clays act as catalysts with low activation energy and facilitate oxidation process at the gas/solids interface. It is preferable to establish the presence of clay type. Smectite has lower activation energy compared to illite. The chlorite and kaolinite have comparably higher activation energies. The catalyst effect of clays in the presence of oxygen MNB can contribute to an overall higher oxidation rate and improved recovery.

The magnetized oxygen MNB water facilitates the cleavage of ester, ether and sulfur bonds. The core molecule of asphaltenes is bound with alkanes, cyclohexane, aromatic hydrocarbons and heteroatom organic groups via ester, ether and sulfur bonds. The cleavage process under alkaline conditions effect/separate the bound groups from the asphaltenes molecules which will be further oxidized/broken into resins molecules and/or lower molecular weight compounds.

The final treated product will have:
1. Lower viscosity and surface tension;
2. Lower interfacial tension;
3. Single phase mixture of organic compounds; saturates, aromatics, resins, lower concentration of asphaltenes and overall with modified structure of bitumen components;
4. Anions are less hydrated by MNB and they stay at gas/liquid interface and cations are more hydrated and stay in the bulk liquid effecting the physicochemical properties of the bulk liquid;
5. The treatment efficiency by the oxygen MNB is four times that of air MNB. The use of air MNB results in coalescence of nitrogen MNB into larger disruptive bubbles effecting the process efficiency.
6. The bitumen extraction efficiency can be further improved by treating tar sands with magnetized oxygen MNB during the grinding step. During the grinding the MNB mix with tar sands and further breaks down by grinding stress forces. This step breaks the outer bitumen layer and overall depolarization of bitumen. It can also contribute to the efficiency of grinding process. To achieve higher efficiency higher concentration of MNB, high magnetic flux and a temperature of 40 to 45° C. is required.
7. HCO can have dissolved gases and volatile organics. A handling and process system with safety features need to be included in the treatment of HCO with magnetized oxygen/air MNB.

OILY WASTE/SLUDGE TREATMENT. The present invention can be applied treat oily waste/sludge as well as surface oil shale from oil refinery operation to recover valuable organic products. Under alkaline conditions the treatment with magnetized oxygen MNB can recover product with processable properties.

RECOVERY OF THE BOTTOM OF BARREL. In the existing oil refinery operation the unrecoverable bottom product called asphalt; a mixture of asphaltenes, resins, maltenes, heavy waxes and heavy metals salts, can be treated with alkaline magnetized oxygen MNB water. The asphaltenes/resins/maltenes/waxes metals will be will be broken into low molecular weight components and heavy metals oxidized into settling salts.

The magnetized oxygen MNB water has unique and enhanced physicochemical characteristics with high mobility of ions, stable MNB and ionized organic and inorganic components depending upon their polarizability. The present invention can be applied to treat the following:
1. Waste water and sewage water.
2. Brackish water.
3. Irrigation water.
4. Seawater for fish forms as well as offshore fish forms water.
5. Industrial waste containing organics and metal salts.
6. Produce water for re-injection,
7. Oily waste water.

DRINKING WATER TREATMENT. The present invention can be applied to treat chemicals in drinking water supply from local aquifers. The treatment is generally followed by Reverse Osmosis. The composition of regulated and unregulated chemicals in aquifers varies with location. The regulated chemicals are removed by the existing art of technology. Some time the existing art of technology is not effective to remove chemicals like 1,4 dioxane and polychlorinated organics. The present invention will breakdown regulated/unregulated chemicals which can be removed by the existing art of technology.

SWIMMING POOL WATER TREATMENT. The present invention can be applied to treat pool water without the use of chemicals. A package unit will be required to produce magnetized air MNB for optimum distribution of MNB water.

TREATMENT OF LIGNOCELLULOSE BIOMASS. The present invention can be applied to treat biomass under alkaline conditions to produce biofuels.

COAL TREATMENT. The present invention can be applied to treat raw coal requiring demineralization/leaching with magnetized air MNB water and oxydesulfurization under alkaline conditions with magnetized oxygen MNB to produce petroleum grade coal mixture.

The invention claimed is:

1. A method for the treatment of heavy crude oil with magnetized oxygen/air micro nano bubble water, comprising the steps of:
   generating micro nano bubbles water from treated water by a depressurization process;
   pumping heavy crude oil and oxygen with the micro nano bubbles water at an injection port;
   injecting via the injection port a mixture of heavy crude oil and oxygen micro nano bubbles water into a first magnetic unit;
   subjecting the mixture to a magnetic field under static mixing conditions in the first magnetic unit;
   injecting the mixture into an interim tank;
   pressurizing the heavy crude oil and water exiting the interim tank via a slurry pump;
   pumping the heavy crude oil and water through a second magnetic unit before routing to a first hydrocyclone unit; and
   routing an overflow of the heavy crude oil for refinery purposes.

2. The method of claim 1, wherein the depressurization process comprises the steps of:
   mixing a slip stream from the treated water with controlled oxygen/air and a $NH_4OH/H_2O_2$ solution;
   pumping a mixture of water, oxygen/air, and $NH_4OH/H_2O_2$ solution to a pressurized state by a regenerative turbine pump to increase the solubility of oxygen;
   subjecting the mixture of water, oxygen/air, and $NH_4OH/H_2O_2$ solution to an axial magnetic field via a third magnetic unit; and
   depressurizing the mixture to a lower pressure via the injection port to facilitate micro nano bubbles formation.

3. The method of claim 2, wherein the mixture of water, oxygen, and $NH_4OH/H_2O_2$ solution is pressurized to a range of between 80-120 PSIG.

4. The method of claim 2, wherein the third magnetic unit has an axial magnetic field of 40-50 mT.

5. The method of claim 1 the first magnetic unit has a magnetic field of at least 4,500 mT.

6. The method of claim 1, wherein the mixture of heavy crude oil and oxygen micro nano bubbles water is injected into a first magnetic unit at a velocity of three times that of the velocity of the heavy crude oil and oxygen.

7. The method of claim 1, wherein the mixture is tangentially injected into the interim tank in order to produce a swirling effect and separate solids from the mixture.

8. The method of claim 7, wherein the interim tank operates at a range of 0-5 PSIG.

9. The method of claim 7, wherein the interim tank is sized for a 3-5 minute retention time.

10. The method of claim 1, wherein the second magnetic unit has a magnetic field of at least 100 mT.

11. The method of claim 1, further comprising the step of pumping an underflow of water and solids from the first hydrocyclone to an inlet of a secondary hydrocyclone for separation.

12. A method for extracting bitumen from tar sands, comprising the steps of:
    passing tar sands through a feed hopper;
    mixing the tar sands with a first micro nano bubbles stream in a grinding mill to partially treat the tar sands;
    routing the partially treated tar sands to a slurry tank under fluidized conditions;
    maintaining a high concentration of oxygen micro nano bubbles by injection of a mixture of micro nano bubbles and $NH_4OH/H_2O_2$ solution into the slurry tank; and
    recirculating an effluent stream of tar sands and micro nano bubbles water from and back to the slurry tank.

13. The method of claim 12, wherein the first micro nano bubbles stream is alkaline and magnetized.

14. The method of claim 12, wherein the slurry tank has a temperature of 40° C. and a pH 9-12.

15. The method of claim 12, further comprising the steps of:
    mixing the effluent stream from the slurry tank with a second micro nano bubbles stream at a first injection port;
    pressurizing the effluent stream and the second micro nano bubbles stream to 50 PSIG;
    magnetizing the effluent stream and second micro nano bubbles stream in a first magnetic unit; and
    routing an exit stream of tar sands and magnetized micro nano bubbles water to the slurry tank and a primary phase separation tank.

16. The method of claim 15, wherein 75% of the exit stream reenters the slurry tank and 25% enters the primary phase separation tank.

17. The method of claim 15, wherein the primary phase separation tank separates out a semi-liquid crude bitumen.

18. The method of claim 15, further comprising the steps of:
    mixing the crude bitumen liquid with third micro nano bubbles stream via a second injection port;
    pressurizing a mixture of the crude bitumen liquid and the third micro nano bubbles stream to 50 PSIG;
    magnetizing the mixture of the crude bitumen liquid and the third micro nano bubbles stream in a second magnetic unit; and
    routing the mixture of the crude bitumen liquid and the third micro nano bubbles stream o a secondary interim tank for separation of the crude bitumen liquid from water.

19. A system for the treatment of heavy crude oil with magnetized oxygen/air micro nano bubble water, comprising:
    a first magnetic unit for magnetizing a mixture of heavy crude oil, oxygen, and micro nano bubbles water;

an interim tank for separation of solids from the heavy crude oil;
a pump for pressurization of the heavy crude oil and water exiting the interim tank;
a second magnetic unit for magnetizing the heavy crude oil and water;
a hydrocyclone unit for separation of water and solids from the magnetized heavy crude oil and water from the second magnetic unit.

* * * * *